(12) United States Patent
Mawri

(10) Patent No.: US 12,440,512 B1
(45) Date of Patent: Oct. 14, 2025

(54) SYSTEMS AND METHODS FOR PREPARING AND ADMINISTERING A HYDRATING SUPPLEMENT COMPOSITION

(71) Applicant: I.V. Nectar MD, PLLC, Flint, MI (US)

(72) Inventor: Faisal Mawri, Flushing, MI (US)

(73) Assignee: IV NECTOR MD, Flint, MI (US)

( * ) Notice: Subject to any disclaimer, the term of this patent is extended or adjusted under 35 U.S.C. 154(b) by 0 days.

(21) Appl. No.: 18/973,027

(22) Filed: Dec. 8, 2024

(51) Int. Cl.
| | |
|---|---|
| A61K 33/32 | (2006.01) |
| A61K 31/145 | (2006.01) |
| A61K 31/198 | (2006.01) |
| A61K 31/205 | (2006.01) |
| A61K 31/375 | (2006.01) |
| A61K 31/401 | (2006.01) |
| A61K 31/407 | (2006.01) |
| A61K 31/4178 | (2006.01) |
| A61K 31/4188 | (2006.01) |
| A61K 31/426 | (2006.01) |
| A61K 31/4415 | (2006.01) |
| A61K 31/455 | (2006.01) |
| A61K 31/51 | (2006.01) |
| A61K 31/555 | (2006.01) |
| A61K 31/675 | (2006.01) |
| A61K 31/7076 | (2006.01) |
| A61K 31/714 | (2006.01) |
| A61K 33/06 | (2006.01) |
| A61K 33/30 | (2006.01) |

(52) U.S. Cl.
CPC ............ *A61K 33/32* (2013.01); *A61K 31/145* (2013.01); *A61K 31/198* (2013.01); *A61K 31/205* (2013.01); *A61K 31/375* (2013.01); *A61K 31/401* (2013.01); *A61K 31/407* (2013.01); *A61K 31/4178* (2013.01); *A61K 31/4188* (2013.01); *A61K 31/426* (2013.01); *A61K 31/4415* (2013.01); *A61K 31/455* (2013.01); *A61K 31/51* (2013.01); *A61K 31/555* (2013.01); *A61K 31/675* (2013.01); *A61K 31/7076* (2013.01); *A61K 31/714* (2013.01); *A61K 33/06* (2013.01); *A61K 33/30* (2013.01)

(58) Field of Classification Search
None
See application file for complete search history.

(56) References Cited

U.S. PATENT DOCUMENTS

| | | | | |
|---|---|---|---|---|
| 5,100,677 | A * | 3/1992 | Veech | A61K 33/14 514/529 |
| 5,397,786 | A * | 3/1995 | Simone | A61K 31/00 426/74 |
| 5,447,730 | A * | 9/1995 | Greenleaf | A23L 2/60 424/680 |
| 7,375,089 | B2 * | 5/2008 | Verlaan | A23L 2/38 514/23 |
| 7,566,463 | B2 * | 7/2009 | Ayala | A61K 31/19 514/23 |
| 8,557,301 | B2 * | 10/2013 | Dolhun | A61P 31/04 514/23 |
| 10,548,865 | B1 * | 2/2020 | Ouyang | A23L 33/16 |
| 2007/0160683 | A1 * | 7/2007 | Johnson | A61K 31/198 514/23 |
| 2009/0148566 | A1 * | 6/2009 | Murray | A61K 33/14 426/74 |
| 2010/0316732 | A1 * | 12/2010 | Smith | A61K 31/198 424/639 |
| 2011/0142962 | A1 * | 6/2011 | Luebbers | A61P 43/00 424/680 |
| 2015/0174162 | A1 * | 6/2015 | Bartolozzi | A61K 31/7004 424/663 |
| 2017/0128486 | A1 * | 5/2017 | Desbarats | A23L 33/16 |
| 2022/0046960 | A1 * | 2/2022 | Ruppman | A61K 9/0095 |
| 2022/0354879 | A1 * | 11/2022 | Holzmeister | A61K 47/22 |
| 2024/0261321 | A1 * | 8/2024 | Leon Camacho | A61K 33/34 |
| 2024/0415863 | A1 * | 12/2024 | Erickson | A61K 47/02 |

* cited by examiner

*Primary Examiner* — Bethany P Barham
*Assistant Examiner* — Peter Anthopolos
(74) *Attorney, Agent, or Firm* — Ahmad El-Bkaily

(57) ABSTRACT

In some implementations, the treatment may include preparing the hydrating supplement composition in a first bag and a second bag having an inlet, an outlet, and containing 500 mL of a saline solution. In addition, the treatment may include mixing into the first bag, via the inlet of the first bag, ingredients. The treatment may include mixing into the second bag, via the inlet of the second bag, ingredients. Also, the treatment may include absorbing the hydrating supplement composition of the first bag, via the first vein, by opening the clamp of the first gravity hose and the clamp of the first extension tubing. Further, the treatment may include absorbing the hydrating supplement composition of the second bag, via the second vein, by opening the clamp of the second gravity hose and the clamp of the second extension tubing.

4 Claims, 3 Drawing Sheets

SYSTEMS AND METHODS FOR PREPARING AND ADMINISTERING A HYDRATING SUPPLEMENT COMPOSITION

TECHNICAL FIELD

The invention generally relates to administering a hydrating supplement composition to a patient.

BACKGROUND

Patients may suffer from the effects of dehydration and depletion of certain vitamins and minerals in their bodies. The effects of dehydration alone may include dry itchy skin, dry mouth, sunken eyes, headaches, dizziness, muscle cramps, constipation, low blood pressure, rapid heartbeat, and more. Treatments for dehydration vary in effectiveness and may require the consumption of supplements and fluids to replenish lost fluids and electrolytes. Common consumption methods may require an extended period of time before the benefits are fully realized.

SUMMARY

It is an advantage of the present invention to provide replenishment of fluids, electrolytes, vitamins, and minerals to a patient via an intravenous (IV) treatment for increased absorption in a lessened period of time.

In one general aspect, the method may include preparing the hydrating supplement composition in a first bag having an inlet, an outlet, the bag containing 500 mL of a saline solution, and a second bag having an inlet, an outlet, and a second outlet, the bag containing 500 mL of a saline solution. The method may also include mixing into the first bag, via the inlet of the first bag, ingredients, to create a first portion of the hydrating supplement composition having: ascorbic acid in an amount from about 1 mg/ml to about 5 mg/ml, thiamine HCL in an amount from about 0.2 mg/ml to about 0.6 mg/ml, niacinamide in an amount from about 0.2 mg/ml to about 0.6 mg/ml, riboflavin 5 phosphate in an amount from about 0.004 mg/ml to about 0.012 mg/ml, dexpanthenol in an amount from about 0.004 mg/ml to about 0.012 mg/ml, pyridoxine HCL in an amount from about 0.004 mg/ml to about 0.012 mg/ml, arginine HCL in an amount from about 0.2 mg/ml to about 0.6 mg/ml, citrulline in an amount from about 0.1 mg/ml to about 0.3 mg/ml, lysine HCL in an amount from about 0.1 mg/ml to about 0.3 mg/ml, proline in an amount from about 0.1 mg/ml to about 0.3 mg/ml, glutathione in an amount from about 2 mg/ml to about 2 mg/ml, and methylcobalamin in an amount from about 0.01 mg/ml to about 0.03 mg/ml. The method may furthermore include mixing into the second bag, via the inlet of the second bag, ingredients, to create a second portion of the hydrating supplement composition having: magnesium chloride in an amount from about 0.16 mg/ml to about 0.48 mg/ml, zinc sulfate in an amount from about 0.002 mg/ml to about 0.006 mg/ml, manganese sulfate in an amount from about 0.00004 mg/ml to about 0.00012 mg/ml, and copper gluconate in an amount from about 0.0004 mg/ml to about 0.0012 mg/ml. The method may, in addition, include absorbing, by the patient, the hydrating supplement composition from the first bag and the second bag.

Implementations may include one or more of the following features. The method where absorbing, by the patient, the hydrating supplement composition further may include: attaching a first gravity hose having a clamp in a closed configuration to the outlet of the first bag; attaching a second gravity hose having a clamp in a closed configuration to the outlet of the second bag; inserting a first IV catheter to a first vein of the patient and connecting a first extension tubing having a clamp in a closed configuration to the first IV catheter; inserting a second IV catheter to a second vein of the patient and connecting a second extension tubing having a clamp in a closed configuration to the second IV catheter; connecting the first gravity hose to the first extension tubing; connecting the second gravity hose to the second extension tubing; absorbing the hydrating supplement composition of the first bag, via the first vein, by opening the clamp of the first gravity hose and the clamp of the first extension tubing; and absorbing the hydrating supplement composition of the second bag, via the second vein, by opening the clamp of the second gravity hose and the clamp of the second extension tubing.

Implementations may further include one or more of the following features. The method where the patient further absorbs a third portion of the hydrating supplement composition from a third bag having an inlet, an outlet, and 500 mL of the saline solution, where the third portion is prepared by: mixing, in a vial containing NAD+ in an amount of about 250 mg to about 500 mg, 10 mL of air; mixing, in the vial, 10 mL of bacteriostatic water; heating and mixing the contents of the vial until the contents are dissolved; and mixing into the third bag, via the inlet of the third bag, ingredients to create the third portion of the hydrating supplement composition having: NAD+ in an amount from about 0.5 mg/ml to about 1 mg/ml.

The method of mixing into the second bag, via the inlet of the second bag, ingredients in order for the second portion of the hydrating supplement solution to further may include acetylcysteine in an amount from about 0.4 mg/ml to about 1.2 mg/ml. The method of mixing into the first bag, via the inlet of the first bag, ingredients in order for the first portion of the hydrating supplement solution to further may include biotin in an amount from about 0.001 mg/ml to about 0.003 mg/ml. The method of mixing into the first bag, via the inlet of the first bag, ingredients in order for the first portion of the hydrating supplement solution to further may include L-carnitine in an amount from about 1 mg/ml to about 3 mg/ml. The method of mixing into the first bag, via the inlet of the first bag, ingredients in order for the first portion of the hydrating supplement solution to further may include L-taurine in an amount from about 0.1 mg/ml to about 0.3 mg/ml. The method of mixing into the first bag, via the inlet of the first bag, ingredients in order for the first portion of the hydrating supplement solution to further may include ketorolac tromethamine in an amount from about 0.06 mg/ml to about 0.18 mg/ml. The method of mixing into the first bag, via the inlet of the first bag, ingredients in order for the first portion of the hydrating supplement solution to further may include ondansetron in an amount from about 0.004 mg/ml to about 0.008 mg/ml. The method of mixing into the first bag, via the inlet of the first bag, ingredients in order for the first portion of the hydrating supplement solution to further may include famotidine in an amount from about 0.02 mg/ml to about 0.04 mg/ml.

Other embodiments of this aspect include corresponding means of administering the solution, each configured to perform the actions of the methods.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION

Figure 1:
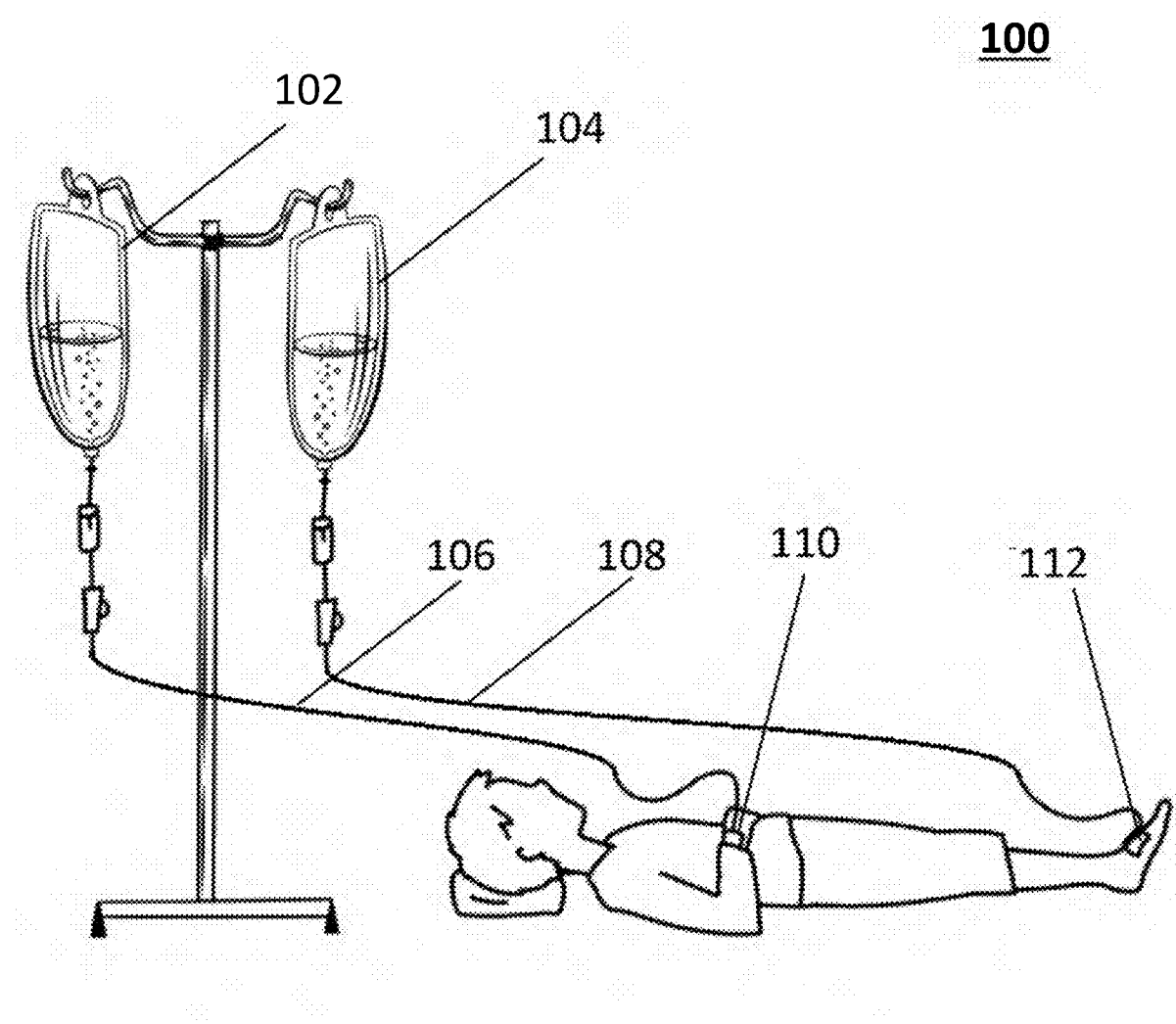
FIG. 1 illustrates an example embodiment of administering the hydrating supplement composition to a patient, according to the methods and compositions described herein.

Detailed reference will now be made to the currently preferred compositions, embodiments, and methods of the present invention, which represent the best modes of practicing the invention known to the inventors at this time. The Figures provided are not necessarily to scale. It should be understood that the disclosed embodiments are merely examples of the invention, which can be embodied in various and alternative forms. Therefore, the specific details disclosed here should not be seen as limiting but rather as a representative basis for any aspect of the invention and/or as a guide for those skilled in the art to utilize the present invention in various ways.

Unless stated otherwise in the examples or explicitly indicated, all numerical quantities in this description, which denote amounts of material or conditions of reaction and/or use, should be understood as being modified by the term "about" to describe the broadest scope of the invention. Generally, practice within the stated numerical limits is preferred. Also, unless expressly stated otherwise, percentage, parts, and ratio values are by weight. When a group or class of materials is described as suitable or preferred for a specific purpose in connection with the invention, it implies that mixtures of any two or more members of the group or class are equally suitable or preferred. The description of constituents in chemical terms refers to their state at the time of addition to any combination specified and does not necessarily exclude chemical interactions among the constituents once mixed. The first definition of an acronym or abbreviation applies to all subsequent uses herein and similarly applies to normal grammatical variations of the initially defined abbreviation. Unless expressly stated otherwise, the measurement of a property is determined by the same technique as previously or later referenced for the same property.

It should also be understood that this invention is not confined to the specific embodiments and methods described below, as specific components and/or conditions may vary. Furthermore, the terminology used herein is solely for the purpose of describing particular embodiments of the present invention and is not intended to be limiting in any manner.

Additionally, it should be noted that, as used in the specification and the appended claims, the singular forms "a," "an," and "the" include plural referents unless the context clearly dictates otherwise. For instance, a reference to a component in the singular is intended to include multiple components.

The following description of the embodiment(s) is purely exemplary in nature and is not intended to limit the invention, its application, or its uses in any way.

In an embodiment of the present invention, a hydrating supplement composition is provided. The hydrating supplement composition may include a saline solution which may have a concentration of water to sodium chloride at ratio of 0.9 grams of sodium chloride per liter of water (i.e., 0.9%). For example, a 500 ml quantity of saline solution may include 4.5 grams of sodium chloride. The use of a saline solution may be beneficial as a source of hydration and electrolytes.

In some embodiments, the hydrating supplement composition may be administered in two or more separate bags. Certain ingredients may be harmful when combined and administered to the patient in the same vein. Specifically, some minerals may crystalize in the presence of other ingredients in the hydrating supplement composition. In some rare instances, a patient may develop inflammation of the veins and thrombophlebitis. To reduce this possibility, the mineral components of the hydrating supplement composition are separated into a second bag and administered to a second vein.

In a first embodiment, the first bag of the hydrating supplement composition may further include a source of vitamin C. In some embodiments, the vitamin C may be in the form of ascorbic acid, which may be beneficial in reducing the risk of chronic diseases such as cardiovascular disease, age-related macular degeneration, and more. In a refinement of the present embodiments, the ascorbic acid is present in the amount of 1 mg/ml to about 5 mg/ml. In another refinement of the present embodiment, the ascorbic acid is present in the amount of 2 mg/ml to about 4 mg/ml. In another refinement of the present embodiment, the ascorbic acid is present in the amount of 2.5 mg/ml to about 3.5 mg/ml.

In the first embodiment, the first bag of the hydrating supplement composition may further include a source of vitamin B1. In some embodiments, the vitamin B1 may be in the form of thiamine HCL, which may be beneficial in helping treat causes of heart failure, keeping the nervous system healthy, and helping strengthen the immune system. In a refinement of the present embodiments, the thiamine HCL is present in the amount of 0.2 mg/ml to about 0.6 mg/ml. In another refinement of the present embodiment, the thiamine HCL is present in the amount of 0.28 mg/ml to about 0.54 mg/ml. In another refinement of the present embodiment, the thiamine HCL is present in the amount of 0.32 mg/ml to about 0.49 mg/ml.

In the first embodiment, the first bag of the hydrating supplement composition may further include a source of vitamin B3. In some embodiments, the vitamin B3 may be in the form of niacinamide, which may be beneficial for the appearance of skin, help slow the progression of diabetes, and help improve joint flexibility. In a refinement of the present embodiments, the niacinamide is present in the amount of 0.2 mg/ml to about 0.6 mg/ml. In another refinement of the present embodiment, the niacinamide is present in the amount of 0.28 mg/ml to about 0.54 mg/ml. In another refinement of the present embodiment, the niacinamide is present in the amount of 0.32 mg/ml to about 0.49 mg/ml.

In the first embodiment, the first bag of the hydrating supplement composition may further include a source of vitamin B2. In some embodiments, the vitamin B2 may be in the form of riboflavin 5 phosphate, which may be beneficial for the production of cellular energy, help support cellular growth, and help metabolize fats, drugs, and steroids. In a refinement of the present embodiments, the riboflavin 5 phosphate is present in the amount of 0.004 mg/ml to about 0.012 mg/ml. In another refinement of the present embodiment, the riboflavin 5 phosphate is present in the amount of 0.006 mg/ml to about 0.0011 mg/ml. In another refinement of the present embodiment, the riboflavin 5 phosphate is present in the amount of 0.007 mg/ml to about 0.009 mg/ml.

In the first embodiment, the first bag of the hydrating supplement composition may further include a source of vitamin B5. In some embodiments, the vitamin B5 may be in the form of dexpanthenol, which may be beneficial for the production of cellular energy, help provide deep hydration of the skin, help soothe sensitive skin, and aid in the regeneration of damaged skin. In a refinement of the present embodiments, the dexpanthenol is present in the amount of 0.004 mg/ml to about 0.012 mg/ml. In another refinement of the present embodiment, the dexpanthenol is present in the amount of 0.006 mg/ml to about 0.0011 mg/ml. In another refinement of the present embodiment, the dexpanthenol is present in the amount of 0.007 mg/ml to about 0.009 mg/ml.

In the first embodiment, the first bag of the hydrating supplement composition may further include a source of vitamin B6. In some embodiments, the vitamin B6 may be in the form of pyridoxine HCL, which may be beneficial for helping improve mood, easing nausea during pregnancy, and lowering the risk of eye disease. In a refinement of the present embodiments, the pyridoxine HCL is present in the amount of 0.004 mg/ml to about 0.012 mg/ml. In another refinement of the present embodiment, the pyridoxine HCL is present in the amount of 0.006 mg/ml to about 0.0011 mg/ml. In another refinement of the present embodiment, the pyridoxine HCL is present in the amount of 0.007 mg/ml to about 0.009 mg/ml.

In the first embodiment, the first bag of the hydrating supplement composition may further include a first source of amino acids. In some embodiments, the first source of amino acids may be in the form of arginine HCL, which may be beneficial for helping treat heart and circulatory diseases, reduce fatigue, and stimulate the immune system. In a refinement of the present embodiments, the arginine HCL is present in the amount of 0.2 mg/ml to about 0.6 mg/ml. In another refinement of the present embodiment, the arginine HCL is present in the amount of 0.28 mg/ml to about 0.54 mg/ml. In another refinement of the present embodiment, the arginine HCL is present in the amount of 0.32 mg/ml to about 0.49 mg/ml.

In the first embodiment, the first bag of the hydrating supplement composition may further include a second source of amino acids. In some embodiments, the second source of amino acids may be in the form of citrulline, which may be beneficial for improving flood flow and reducing blood pressure. In a refinement of the present embodiments, the citrulline is present in the amount of 0.1 mg/ml to about 0.3 mg/ml. In another refinement of the present embodiment, the citrulline is present in the amount of 0.16 mg/ml to about 0.27 mg/ml. In another refinement of the present embodiment, the citrulline is present in the amount of 0.19 mg/ml to about 0.22 mg/ml.

In the first embodiment, the first bag of the hydrating supplement composition may further include a third source of amino acids. In some embodiments, the third source of amino acids may be in the form of lysine HCL, which may be beneficial for helping support metabolism. In a refinement of the present embodiments, the lysine HCL is present in the amount of 0.1 mg/ml to about 0.3 mg/ml. In another refinement of the present embodiment, the lysine HCL is present in the amount of 0.16 mg/ml to about 0.27 mg/ml.

In another refinement of the present embodiment, the lysine HCL is present in the amount of 0.19 mg/ml to about 0.24 mg/ml.

In the first embodiment, the first bag of the hydrating supplement composition may further include a fourth source of amino acids. In some embodiments, the fourth source of amino acids may be in the form of proline, which may be beneficial for healing wounds, helping support immune response, and other health benefits. In a refinement of the present embodiments, the proline is present in the amount of 0.1 mg/ml to about 0.3 mg/ml. In another refinement of the present embodiment, the proline is present in the amount of 0.15 mg/ml to about 0.28 mg/ml. In another refinement of the present embodiment, the proline is present in the amount of 0.18 mg/ml to about 0.23 mg/ml.

In the first embodiment, the first bag of the hydrating supplement composition may further include a source of antioxidants. In some embodiments, the antioxidant source may be in the form of glutathione, which may be beneficial for helping repair damaged cells, help remove toxins, and help maintain healthy skin. In a refinement of the present embodiments, the glutathione is present in the amount of 1.2 mg/ml to about 2 mg/ml. In another refinement of the present embodiment, the glutathione is present in the amount of 1.35 mg/ml to about 1.88 mg/ml. In another refinement of the present embodiment, the glutathione is present in the amount of 1.46 mg/ml to about 1.62 mg/ml.

In the first embodiment, the first bag of the hydrating supplement composition may further include a source of vitamin B12. In some embodiments, the source of B12 may be in the form of methylcobalamin, which may be beneficial for helping supplement patients deficient of B12. In a refinement of the present embodiments, the methylcobalamin is present in the amount of 0.01 mg/ml to about 0.03 mg/ml. In another refinement of the present embodiment, the methylcobalamin is present in the amount of 0.015 mg/ml to about 0.025 mg/ml. In another refinement of the present embodiment, the methylcobalamin is present in the amount of 0.018 mg/ml to about 0.021 mg/ml.

In the first embodiment, the second bag of hydrating supplement composition may further include a first source of minerals. In some embodiments, the first source of minerals may be in the form of magnesium chloride, which may be beneficial for helping increase low levels of magnesium, and help with high blood pressure. In a refinement of the present embodiments, the magnesium chloride is present in the amount of 0.16 mg/ml to about 0.48 mg/ml. In another refinement of the present embodiment, the magnesium chloride is present in the amount of 0.2 mg/ml to about 0.4 mg/ml. In another refinement of the present embodiment, the magnesium chloride is present in the amount of 0.28 mg/ml to about 0.36 mg/ml.

In the first embodiment, the second bag of the hydrating supplement composition may further include a second source of minerals. In some embodiments, the second source of minerals may be in the form of zinc sulfate, which may be beneficial for helping reduce cold symptoms and help relieve diarrhea. In a refinement of the present embodiments, the zinc sulfate is present in the amount of 0.002 mg/ml to about 0.006 mg/ml. In another refinement of the present embodiment, the zinc sulfate is present in the amount of 0.0028 mg/ml to about 0.0052 mg/ml. In another refinement of the present embodiment, the zinc sulfate is present in the amount of 0.0034 mg/ml to about 0.0048 mg/ml.

In the first embodiment, the second bag of the hydrating supplement composition may further include a third source of minerals. In some embodiments, the third source of minerals may be in the form of manganese sulfate, which may be beneficial for increasing low levels of manganese in the body, and may help reduce bone strength. In a refinement of the present embodiments, the manganese sulfate is present in the amount of 0.00004 mg/ml to about 0.00012 mg/ml. In another refinement of the present embodiment, the manganese sulfate is present in the amount of 0.00006 mg/ml to about 0.0001 mg/ml. In another refinement of the present embodiment, the manganese sulfate is present in the amount of 0.00007 mg/ml to about 0.00009 mg/ml.

In the first embodiment, the second bag of the hydrating supplement composition may further include a fourth source of minerals. In some embodiments, the fourth source of minerals may be in the form of copper gluconate, which may be beneficial for helping slow down greying of hair, and strengthening hair. In a refinement of the present embodiments, the copper gluconate is present in the amount of 0.0004 mg/ml to about 0.0012 mg/ml. In another refinement of the present embodiment, the copper gluconate is present in the amount of 0.0006 mg/ml to about 0.0010 mg/ml. In another refinement of the present embodiment, the copper gluconate is present in the amount of 0.00007 mg/ml to about 0.00009 mg/ml.

The first embodiment of the hydrating supplement composition has anecdotally shown to provide patients with increased energy, greater ability to concentrate, and relief from symptoms of dehydration.

In a second embodiment, the first bag of the hydrating supplement composition may further include a source of vitamin C. In some embodiments, the vitamin C may be in the form of ascorbic acid, which may be beneficial in reducing the risk of chronic diseases such as cardiovascular disease, and age-related macular degeneration. In a refinement of the present embodiments, the ascorbic acid is present in the amount of 1 mg/ml to about 5 mg/ml. In another refinement of the present embodiment, the ascorbic acid is present in the amount of 2 mg/ml to about 4 mg/ml. In another refinement of the present embodiment, the ascorbic acid is present in the amount of 2.5 mg/ml to about 3.5 mg/ml.

In the second embodiment, the first bag of the hydrating supplement composition may further include a source of vitamin B1. In some embodiments, the vitamin B1 may be in the form of thiamine HCL, which may be beneficial in helping treat causes of heart failure, keeping the nervous system healthy, and help strengthen the immune system. In a refinement of the present embodiments, the thiamine HCL is present in the amount of 0.2 mg/ml to about 0.6 mg/ml. In another refinement of the present embodiment, the thiamine HCL is present in the amount of 0.28 mg/ml to about 0.54 mg/ml. In another refinement of the present embodiment, the thiamine HCL is present in the amount of 0.32 mg/ml to about 0.49 mg/ml.

In the second embodiment, the first bag of the hydrating supplement composition may further include a source of vitamin B3. In some embodiments, the vitamin B3 may be in the form of niacinamide, which may be beneficial for the appearance of skin, help slow the progression of diabetes, and help improve joint flexibility. In a refinement of the present embodiments, the niacinamide is present in the amount of 0.2 mg/ml to about 0.6 mg/ml. In another refinement of the present embodiment, the niacinamide is present in the amount of 0.28 mg/ml to about 0.54 mg/ml. In another refinement of the present embodiment, the niacinamide is present in the amount of 0.32 mg/ml to about 0.49 mg/ml.

In the second embodiment, the first bag of the hydrating supplement composition may further include a source of vitamin B2. In some embodiments, the vitamin B2 may be in the form of riboflavin 5 phosphate, which may be beneficial for the production of cellular energy, help support cellular growth, and help metabolize fats, drugs, and steroids. In a refinement of the present embodiments, the riboflavin 5 phosphate is present in the amount of 0.004 mg/ml to about 0.012 mg/ml. In another refinement of the present embodiment, the riboflavin 5 phosphate is present in the amount of 0.006 mg/ml to about 0.0011 mg/ml. In another refinement of the present embodiment, the riboflavin 5 phosphate is present in the amount of 0.007 mg/ml to about 0.009 mg/ml.

In the second embodiment, the first bag of the hydrating supplement composition may further include a source of vitamin B5. In some embodiments, the vitamin B5 may be in the form of dexpanthenol, which may be beneficial for the production of cellular energy, help provide deep hydration of the skin, help soothe sensitive skin, aid in the regeneration of damaged skin, and other health benefits. In a refinement of the present embodiments, the dexpanthenol is present in the amount of 0.004 mg/ml to about 0.012 mg/ml. In another refinement of the present embodiment, the dexpanthenol is present in the amount of 0.006 mg/ml to about 0.0011 mg/ml. In another refinement of the present embodiment, the dexpanthenol is present in the amount of 0.007 mg/ml to about 0.009 mg/ml.

In the second embodiment, the first bag of the hydrating supplement composition may further include a source of vitamin B6. In some embodiments, the vitamin B6 may be in the form of pyridoxine HCL, which may be beneficial for helping improve mood, easing nausea during pregnancy, lowering the risk of eye disease, and other health benefits. In a refinement of the present embodiments, the pyridoxine HCL is present in the amount of 0.004 mg/ml to about 0.012 mg/ml. In another refinement of the present embodiment, the pyridoxine HCL is present in the amount of 0.006 mg/ml to about 0.0011 mg/ml. In another refinement of the present embodiment, the pyridoxine HCL is present in the amount of 0.007 mg/ml to about 0.009 mg/ml.

In the second embodiment, the first bag of the hydrating supplement composition may further include a source of N-acetyl cysteine (NAC). In some embodiments, the NAC may be in the form of preserved acetylcysteine, which may be beneficial for helping treat symptoms of the flu, including dry eyes and cough. In a refinement of the present embodiments, the preserved acetylcysteine is present in the amount of 0.4 mg/ml to about 1.2 mg/ml. In another refinement of the present embodiment, the preserved acetylcysteine is present in the amount of 0.48 mg/ml to about 1.02 mg/ml. In another refinement of the present embodiment, the preserved acetylcysteine is present in the amount of 0.53 mg/ml to about 0.91 mg/ml.

In the second embodiment, a second bag of the hydrating supplement composition may further include a source of zinc. In some embodiments, zinc may be in the form of zinc sulfate, which may be beneficial for reducing cold symptoms, and relieving diarrhea. In a refinement of the present embodiments, the zinc sulfate is present in the amount of 0.02 mg/ml to about 0.06 mg/ml. In another refinement of the present embodiment, the zinc sulfate is present in the amount of 0.027 mg/ml to about 0.051 mg/ml. In another refinement of the present embodiment, the zinc sulfate is present in the amount of 0.034 mg/ml to about 0.047 mg/ml.

The second embodiment of the hydrating supplement composition has been anecdotally shown to provide patients with increased energy, greater ability to concentrate, and relief from symptoms of dehydration.

In some embodiments, the hydrating supplement composition may further include alpha lipoic acid. In some embodiments, the alpha lipoic acid may be added to the first bag. Alpha lipoic acid may be beneficial for providing protection for the brain and may be helpful in certain liver diseases. In a refinement of the present embodiments, the alpha lipoic acid is present in the amount of 0.05 mg/ml to about 0.15 mg/ml. In another refinement of the present embodiment, the alpha lipoic acid is present in the amount of 0.07 mg/ml to about 0.12 mg/ml. In another refinement of the present embodiment, the alpha lipoic acid is present in the amount of 0.095 mg/ml to about 0.115 mg/ml.

In some embodiments, the hydrating supplement composition may further include acetylcysteine (a.k.a., NAC). In some embodiments, the acetylcysteine may be added to the second bag. Acetylcysteine may be beneficial for loosening thick mucus. In a refinement of the present embodiments, the acetylcysteine is present in the amount of 0.4 mg/ml to about 1.2 mg/ml. In another refinement of the present embodiment, the acetylcysteine is present in the amount of 0.6 mg/ml to about 1 mg/ml. In another refinement of the present embodiment, the acetylcysteine is present in the amount of 0.75 mg/ml to about 0.92 mg/ml.

In some embodiments, the hydrating supplement composition may further include nicotinamide adenine dinucleotide (NAD+). In some embodiments, the NAD+ may be added to a third bag which is administered separately from the first bag and the second bag. NAD+ may be beneficial for maintaining tissue homeostasis and stress response, may improve cardiovascular function, and help lower systolic blood pressure. In a refinement of the present embodiments, the NAD+ is present in the amount of 0.5 mg/ml to about 1 mg/ml. In another refinement of the present embodiment, the NAD+ is present in the amount of 0.65 mg/ml to about 0.94 mg/ml. In another refinement of the present embodiment, the NAD+ is present in the amount of 0.73 mg/ml to about 0.88 mg/ml.

In some embodiments, the hydrating supplement composition may further include a source of B7. In some embodiments, the source of B7 may be biotin. In some embodiments, the biotin may be added to the first bag, which may be beneficial for helping strengthen nails, improving hair quality, and helping convert carbohydrates, fats, and proteins into energy. In a refinement of the present embodiments, the biotin is present in the amount of 0.001 mg/ml to about 0.003 mg/ml. In another refinement of the present embodiment, the biotin is present in the amount of 0.0013 mg/ml to about 0.0028 mg/ml. In another refinement of the present embodiment, the biotin is present in the amount of 0.0019 mg/ml to about 0.0023 mg/ml.

In some embodiments, the hydrating supplement composition may further include L-carnitine. In some embodiments, the L-carnitine may be added to the first bag and may be beneficial for helping treat L-carnitine deficiency and may help with high cholesterol levels in the blood. In a refinement of the present embodiments, the L-carnitine is present in the amount of 1 mg/ml to about 3 mg/ml. In another refinement of the present embodiment, the L-carnitine is present in the amount of 1.4 mg/ml to about 2.8 mg/ml. In another refinement of the present embodiment, the L-carnitine is present in the amount of 1.8 mg/ml to about 2.4 mg/ml.

In some embodiments, the hydrating supplement composition may further include L-taurine. In some embodiments, L-taurine may be added to the first bag and may be beneficial for improving heart and liver functions. In a refinement of the present embodiments, the L-taurine is present in the amount of 0.1 mg/ml to about 0.3 mg/ml. In another refinement of the present embodiment, the L-taurine is present in the amount of 0.13 mg/ml to about 0.28 mg/ml. In another refinement of the present embodiment, the L-taurine is present in the amount of 0.17 mg/ml to about 0.22 mg/ml.

In some embodiments, the hydrating supplement composition may further include ketorolac tromethamine. In some embodiments, the ketorolac tromethamine may be added to the first bag and may be beneficial for helping reduce pain, inflammation, and fever. In a refinement of the present embodiments, the ketorolac tromethamine is present in the amount of 0.06 mg/ml to about 0.18 mg/ml. In another refinement of the present embodiment, the ketorolac tromethamine is present in the amount of 0.09 mg/ml to about 0.15 mg/ml. In another refinement of the present embodiment, the ketorolac tromethamine is present in the amount of 0.11 mg/ml to about 0.13 mg/ml.

In some embodiments, the hydrating supplement composition may further include ondansetron. In some embodiments, the ondansetron may be added to the first bag and may be beneficial for helping alleviate feelings of nausea. In a refinement of the present embodiments, the ondansetron is present in the amount of 0.004 mg/ml to about 0.008 mg/ml. In another refinement of the present embodiment, the ondansetron is present in the amount of 0.0046 mg/ml to about 0.0076 mg/ml. In another refinement of the present embodiment, the ondansetron is present in the amount of 0.0052 mg/ml to about 0.0069 mg/ml.

In some embodiments, the hydrating supplement composition may further include famotidine. In some embodiments, the famotidine may be added to the first bag and may be beneficial for helping reduce symptoms related to heartburn and indigestion. In a refinement of the present embodiments, the famotidine is present in the amount of 0.02 mg/ml to about 0.04 mg/ml. In another refinement of the present embodiment, the famotidine is present in the amount of 0.24 mg/ml to about 0.37 mg/ml. In another refinement of the present embodiment, the famotidine is present in the amount of 0.29 mg/ml to about 0.33 mg/ml.

Referring to FIG. 1 of an example administration environment 100 of a non-limiting example embodiment of how the hydrating supplement composition may be administered to a patient comprising a first bag 102, a second bag 104, a first gravity hose 106, a second gravity hose 108, a first IV catheter and a second IV catheter.

As shown in FIG. 1, the first bag 102 may contain 500 mL of saline solutions with ingredients added according to one of the embodiments of the hydrating supplement composition described above. The second bag 104 may contain 500 mL of a saline solution with ingredients added according to one of the embodiments of the hydrating supplement composition described above. In some embodiments, the saline solution may have a concentration of water to sodium chloride at ratio of 0.9 grams of sodium chloride per liter of water (i.e., 0.9%). For example, a 500 ml quantity of saline solution may include 4.5 grams of sodium chloride. The use of a saline solution may be beneficial as a source of hydration and electrolytes.

As also shown in FIG. 1, the first bag 102 may be fluidly connected to a first gravity hose 106, which may be fluidly connected to the first catheter 110, which may allow the patient to intravenously absorb the contents of the first bag 102. In some embodiments, the medical professional may ensure no air remains in the gravity hoses, the extension tubings, the first bag, and the second bag.

As further shown in FIG. 1, the second bag 104 may be fluidly connected to a second gravity hose 108, which may be fluidly connected to the second catheter 112, which may allow the patient to intravenously absorb the contents of the second bag 104.

In some embodiments, the patient may only be fitted with the first catheter 110 and absorb the contents of the first bag 102 and the second bag 104 sequentially. For example, the health professional may allow the contents of the first bag 102 to be absorbed fully by the patient through the first catheter 110, disconnecting the first bag 102 from the patient and connecting the second bag 104 in its place to continue the absorption of the hydrating supplement composition. In some embodiments, the first bag 102 and the second bag 104 are administered to the patient in no particular order.

The use of two bags being absorbed simultaneously has multiple advantages. The patient may absorb the solution in less time than to absorb the first bag 102 through the first catheter 110 followed by the contents of the second bag 104. The patient also reduces the risk of negative side effects, which have been anecdotally observed, such as headache, swelling, and shortness of breath.

For the purpose of illustration, the first catheter 110 is shown attached to the right arm of the patient and the second catheter 112 is shown attached to the right foot of the patient. This is not meant to limit the invention to attaching catheters to these locations. The first catheter 110 and the second catheter 112 may be attached to any two veins in the body. In a preferred embodiment, the first catheter 110 and the second catheter 112 may be inserted into the median cubital vein of each arm of the patient.

Figure 2:
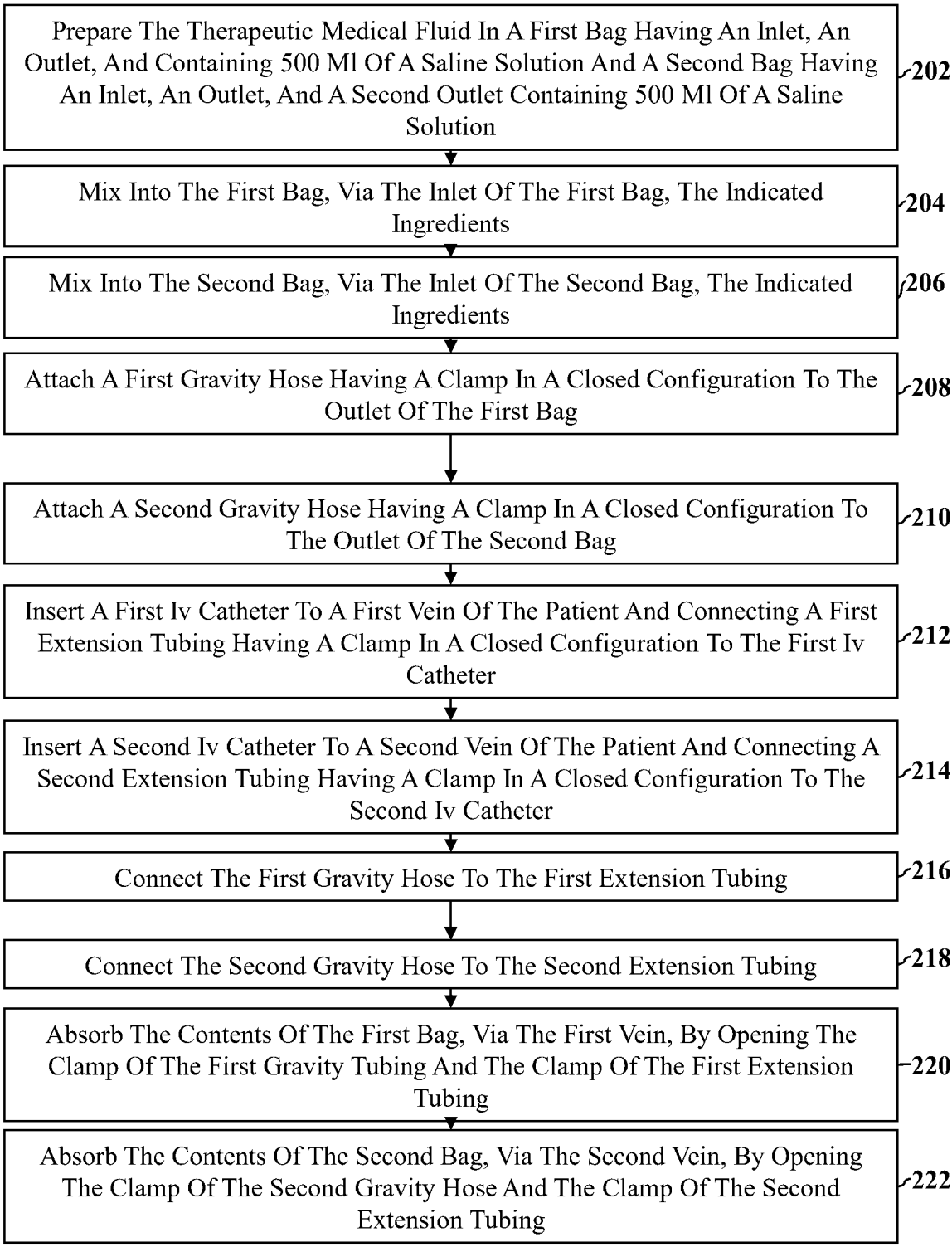
FIG. 2 illustrates a flow chart of an example process for administering the hydrating supplement composition, according to the methods and compositions described herein.

FIG. 2 illustrates an example process 200 for administering the hydrating supplement composition. In some implementations, a medical professional may perform one or more process blocks of FIG. 2. Multiple embodiments of the hydrating supplement composition have been discussed above and may be administered via the process 200, described below.

As shown in FIG. 2, process 200 may include preparing the therapeutic medical fluid in a first bag 102 having an inlet, an outlet, and containing 500 mL of a saline solution and a second bag 104 having an inlet, an outlet, and a second outlet containing 500 mL of a saline solution (block 202). For example, the saline solution may have a concentration of water to sodium chloride at ratio of 0.9 grams of sodium chloride per liter of water (i.e., 0.9%). In some embodiments, the inlet may allow the medical professional to inject ingredients into the first bag 102 and the second bag 104. In some embodiments, the outlet allows the gravity hoses to fluidly connect with the contents of the first bag 102 and the second bag 104.

As also shown in FIG. 2, process 200 may include mixing into the first bag 102, via the inlet of the first bag 102, indicated by any of the example embodiments of the hydrating supplement composition discussed above (block 204). For example, the medical professional may prepare the hydrating supplement composition in the first bag 102 by injecting the component ingredients from a bottle of ingredient solution via a sterile syringe, according to one of the embodiments of the hydrating supplement composition described above.

As further shown in FIG. 2, process 200 may include mixing into the second bag 104, via the inlet of the second bag 104, indicated by any of the example embodiments of the hydrating supplement composition discussed above (block 206). For example, the medical professional may prepare the hydrating supplement composition in the second bag 104 by injecting the component ingredients from a bottle of ingredient solution via a sterile syringe, according to one of the embodiments of the hydrating supplement composition described above.

As also shown in FIG. 2, process 200 may include attaching a first gravity hose 106 having a clamp in a closed configuration to the outlet of the first bag (block 208). For example, the medical professional may attach a first gravity hose 106 having a clamp in a closed configuration to the outlet of the first bag which does not allow the flow of the contents of the first bag 102 until the clamp of the first gravity hose 106 is converted to an open configuration. In some embodiments, the medical professional may open the clamp of the first gravity hose 106 to allow the contents of the first bag 102 to displace any air in the first gravity hose 106.

As further shown in FIG. 2, process 200 may include attaching a second gravity hose having a clamp in a closed configuration to the outlet of the second bag (block 210). For example, the medical professional may attach a second gravity hose 108 having a clamp in a closed configuration to the outlet of the first bag which does not allow the flow of the contents of the second bag 104 until the clamp of the second gravity hose 108 is converted to an open configuration. In some embodiments, the medical professional may open the clamp of the second gravity hose 108 to allow the contents of the second bag 104 to displace any air in the second gravity hose 108.

As also shown in FIG. 2, process 200 may include inserting a first IV catheter 110 to a first vein of the patient and connecting a first extension tubing having a clamp in a closed configuration to the first IV catheter 110 (block 212). For example, the medical professional may sterilize the insertion site, insert the first IV catheter at a 10-30 degree angle, and look for blood return in the catheter, which indicates the catheter has successfully entered the vein. In some embodiments, the medical professional may secure the first extension tubing with a dressing and tape.

As further shown in FIG. 2, process 200 may include inserting a second IV catheter 112 to a second vein of the patient and connecting a second extension tubing having a clamp in a closed configuration to the second IV catheter 112 (block 214). For example, the medical professional may sterilize the insertion site, insert the second IV catheter at a 10-30 degree angle, and look for blood return in the catheter, which indicates the catheter has successfully entered the vein. In some embodiments, the medical professional may secure the second extension tubing with a dressing and tape.

As also shown in FIG. 2, process 200 may include connecting the first gravity hose 106 to the first extension tubing (block 216). For example, the medical professional may ensure no bubbles are in the solution in the first bag 102, unclamp the clamp of the first gravity hose 106, and allow the hydrating supplement composition to flow through the first gravity hose 106 until no air remains. The medical professional may flush the first catheter 110 with a saline solution and connect the first gravity hose 106 to the first catheter 110. In some embodiments, the saline flush may comprise about 5 mL to about 10 mL of a mixture of sodium chloride and water compatible with the patient's body fluids and tissues.

As further shown in FIG. 2, process 200 may include connecting the second gravity hose 108 to the second extension tubing (block 218). For example, the medical professional may ensure no bubbles are in the solution in the second bag 104, unclamp the clamp of the second gravity hose 108, and allow the hydrating supplement composition to flow through the second gravity hose 108 until no air remains. The medical professional may flush the second catheter 112 with a saline solution and connect the second gravity hose 108 to the first catheter 112. In some embodiments, the saline flush may comprise about 5 mL to about 10 mL of a mixture of sodium chloride and water compatible with the patient's body fluids and tissues.

As also shown in FIG. 2, process 200 may include absorbing the saline solution of the first bag 102, via the first vein, by opening the clamp of the first extension tubing (block 220). For example, the medical professional may then unclamp the clamp of the first extension tubing of the first catheter 110 so the patient is fluidly connected to the hydrating supplement composition in the first bag 102.

As further shown in FIG. 2, process 200 may include absorbing the saline solution of the second bag 104, via the second vein, by opening the clamp of the second extension tubing (block 222). For example, the medical professional may then unclamp the clamp of the second extension tubing of the second catheter 112 so the patient is fluidly connected to the hydrating supplement composition in the second bag 104.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 3:
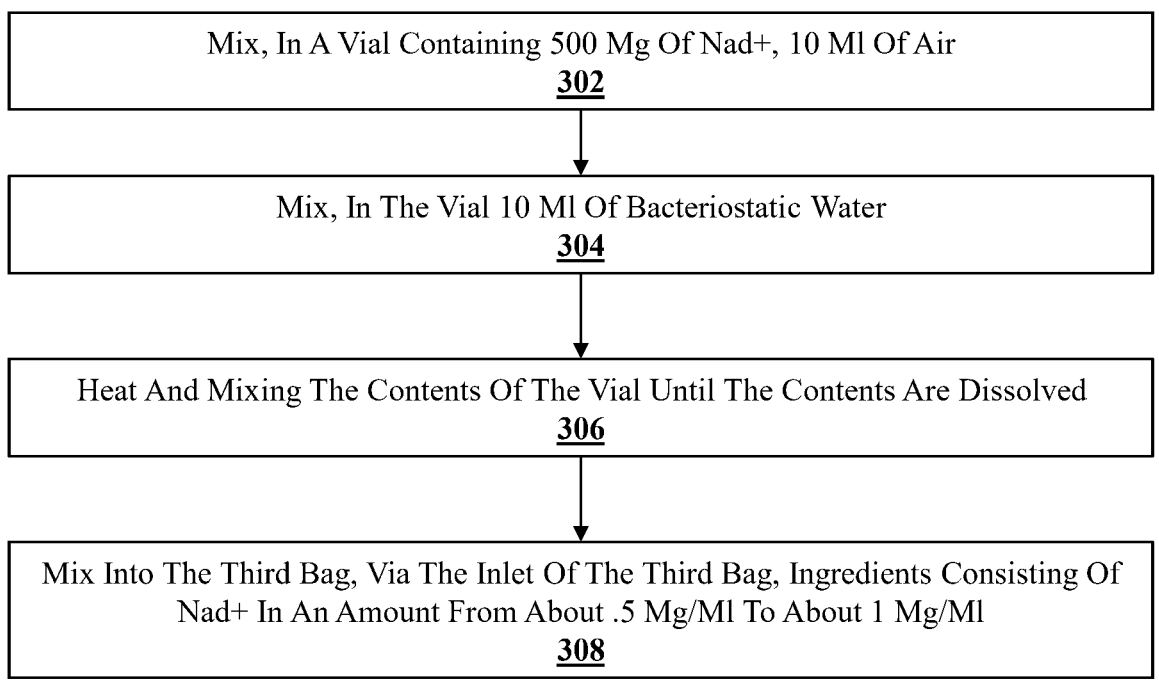
FIG. 3 illustrates a flow chart of an example process for administering an additional portion of the hydrating supplement composition, according to the methods and compositions described herein.

FIG. 3 is a flowchart of an example process 300. In some implementations, one or more process blocks of FIG. 3 may be performed by the medical professional.

Process 300 may include additional implementations, such as any single implementation or any combination of implementations described below and/or in connection with one or more other processes described elsewhere herein. In some embodiments, the first bag 102 and the second bag 104 have already been administered to the patient. In some embodiments, the first bag 102, the second bag 104, and the third bag are administered to the patient one at a time in no particular order. In some embodiments, the third bag may be administered via the first catheter 110 or the second catheter 112.

As shown in FIG. 3, process 300 may include the patient further absorbing the supplement hydrating solution from a third bag having an inlet, an outlet, and 500 mL of the saline solution, where the third bag is prepared by mixing, in a vial containing 500 mg of NAD+10 mL of air (block 302). In some embodiments, the NAD+ vial may contain 500 mg of NAD+ in a powder form and contained in a vacuum. In some embodiments, the medical professional may inject 10 mL of air into the vacuum-sealed vial of NAD+ using a syringe. In some embodiments, the saline solution may have a concentration of water to sodium chloride at ratio of 0.9 grams of sodium chloride per liter of water (i.e., 0.9%). For example, a 500 ml quantity of saline solution may include 4.5 grams of sodium chloride. The use of a saline solution may be beneficial as a source of hydration and electrolytes.

As further shown FIG. 3, process 300 may include mixing, in the vial 10 mL of bacteriostatic water (block 304). In some embodiments, the bacteriostatic water may be a sterile water made to inhibit the growth of bacteria by adding 0.9% benzyl alcohol or a saline solution, which prevents bacteria from growing.

As also shown in FIG. 3, process 300 may include heating and mixing the vial's contents until the contents are completely dissolved (block 306). In some embodiments, the medical professional may gently roll the vial between their palms for 30-90 seconds, until all the particles of the NAD+ powder are visibly dissolved.

As further shown in FIG. 3, process 300 may include mixing into the third bag, via the inlet of the third bag, ingredients having NAD+ in an amount to produce a concentration of about 0.5 mg/ml to about 1 mg/ml (block 308). In some embodiments, the medical professional may draw out the contents of the vial using a syringe and inject the contents into the third bag via the inlet of the third bag. In some embodiments, the medical professional attaches the third bag to the patient via the first gravity hose 106 or the second gravity hose 108 to allow absorption of the contents of the third bag.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

CLAUSES

Example Clause A: A hydrating supplement composition having: ascorbic acid in an amount from about 1 mg/ml to about 5 mg/ml, thiamine HCL in an amount from about 0.2 mg/ml to about 0.6 mg/ml, niacinamide in an amount from about 0.2 mg/ml to about 0.6 mg/ml, riboflavin 5 phosphate in an amount from about 0.004 mg/ml to about 0.012 mg/ml, dexpanthenol in an amount from about 0.004 mg/ml to about 0.012 mg/ml, pyridoxine HCL in an amount from about 0.004 mg/ml to about 0.012 mg/ml, arginine HCL in an amount from about 0.2 mg/ml to about 0.6 mg/ml, citrulline in an amount from about 0.1 mg/ml to about 0.3 mg/ml, lysine HCL in an amount from about 0.1 mg/ml to about 0.3 mg/ml, proline in an amount from about 0.1 mg/ml to about 0.3 mg/ml, glutathione in an amount from about 1.2 mg/ml to about 2 mg/ml, and methylcobalamin in an amount from about 0.01 mg/ml to about 0.03 mg/ml, magnesium chloride in an amount from about 0.16 mg/ml to about 0.48 mg/ml, zinc sulfate in an amount from about 0.002 mg/ml to about 0.006 mg/ml, manganese sulfate in an amount from about 0.00004 mg/ml to about 0.00012 mg/ml, and copper gluconate in an amount from about 0.0004 mg/ml to about 0.0012 mg/ml.

Example Clause B: The hydrating supplement composition of Example Clause A, further having NAD+ in an amount from about 0.5 mg/ml to about 1 mg/ml.

Example Clause C: The hydrating supplement composition of Example Clause A or Example Clause B, further having acetylcysteine in an amount from about 0.4 mg/ml to about 1.2 mg/ml.

Example Clause D: The hydrating supplement composition of any one of Example Clauses A-C, further having biotin in an amount from about 0.001 mg/ml to about 0.003 mg/ml.

Example Clause E: The hydrating supplement composition of any one of Example Clauses A-D, further having L-carnitine in an amount from about 1 mg/ml to about 3 mg/ml.

Example Clause F: The hydrating supplement composition of any one of Example Clauses A-E, further having L-taurine in an amount from about 0.1 mg/ml to about 0.3 mg/ml.

Example Clause G: The hydrating supplement composition of any one of Example Clauses A-F, further having ketorolac tromethamine in an amount from about 0.06 mg/ml to about 0.18 mg/ml.

Example Clause H: The hydrating supplement composition of any one of Example Clauses A-G, further having ondansetron in an amount from about 0.004 mg/ml to about 0.008 mg/ml.

Example Clause I: The hydrating supplement composition of any one of Example Clauses A-H, further having famotidine in an amount from about 0.02 mg/ml to about 0.04 mg/ml.

Example Clause J: A method for preparing and administering a hydrating supplement composition to the patient, may include: providing a first bag having an inlet, an outlet, and containing 500 mL of a saline solution and a second bag having an inlet, an outlet, and a second outlet containing 500 mL of a saline solution; mixing into the first bag, via the inlet of the first bag, ingredients, to create a first portion of the hydrating supplement composition having of: ascorbic acid in an amount from about 1 mg/ml to about 5 mg/ml, thiamine HCL in an amount from about 0.2 mg/ml to about 0.6 mg/ml, niacinamide in an amount from about 0.2 mg/ml to about 0.6 mg/ml, riboflavin 5 phosphate in an amount from about 0.004 mg/ml to about 0.012 mg/ml, dexpanthenol in an amount from about 0.004 mg/ml to about 0.012 mg/ml, pyridoxine HCL in an amount from about 0.004 mg/ml to about 0.012 mg/ml, arginine HCL in an amount from about 0.2 mg/ml to about 0.6 mg/ml, citrulline in an amount from about 0.1 mg/ml to about 0.3 mg/ml, lysine HCL in an amount from about 0.1 mg/ml to about 0.3 mg/ml, proline in an amount from about 0.1 mg/ml to about 0.3 mg/ml, glutathione in an amount from about 1.2 mg/ml to about 2 mg/ml, and methylcobalamin in an amount from about 0.01 mg/ml to about 0.03 mg/ml; mixing into the second bag, via the inlet of the second bag, ingredients, to create a second portion of the hydrating supplement composition having of: magnesium chloride in an amount from about 0.16 mg/ml to about 0.48 mg/ml, zinc sulfate in an amount from about 0.002 mg/ml to about 0.006 mg/ml, manganese sulfate in an amount from about 0.00004 mg/ml to about 0.00012 mg/ml, and copper gluconate in an amount from about 0.0004 mg/ml to about 0.0012 mg/ml; and administering to the patient the hydrating supplement composition from the first bag and the second bag.

Example Clause K: The method of Example Clause J, where administering the hydrating supplement composition to the patient, further may include: attaching a first gravity hose having a clamp in a closed configuration to the outlet of the first bag; attaching a second gravity hose having a clamp in a closed configuration to the outlet of the second bag; inserting a first IV catheter to a first vein of the patient and connecting a first extension tubing having a clamp in a closed configuration to the first IV catheter; inserting a second IV catheter to a second vein of the patient and connecting a second extension tubing having a clamp in a closed configuration to the second IV catheter; connecting the first gravity hose to the first extension tubing; connecting the second gravity hose to the second extension tubing; absorbing the hydrating supplement composition of the first bag, via the first vein, by opening the clamp of the first gravity hose and the clamp of the first extension tubing; and absorbing the hydrating supplement composition of the second bag, via the second vein, by opening the clamp of the second gravity hose and the clamp of the second extension tubing.

Example Clause L: The method of Example Clause J or Example Clause K further may include, administering to a patient a third portion of the hydrating supplement composition from a third bag having an inlet, an outlet, and 500 mL of the saline solution, where the third portion is prepared by: mixing, in a vial containing NAD+ in an amount of about 250 mg to about 500 mg, 10 mL of air; mixing, in the vial, 10 mL of bacteriostatic water; heating and mixing the contents of the vial until the contents are dissolved; and mixing into the third bag, via the inlet of the third bag, ingredients to create the third portion of the hydrating supplement composition having of: NAD+ in an amount from about 0.5 mg/ml to about 1 mg/ml.

Example Clause M: The method of any one of Example Clauses J-L, where mixing into the second bag, via the inlet of the second bag, ingredients in order for the second portion of the hydrating supplement solution to further may include of acetylcysteine in an amount from about 0.4 mg/ml to about 1.2 mg/ml.

Example Clause N: The method of any one of Example Clauses J-M, where mixing into the first bag, via the inlet of the first bag, ingredients in order for the first portion of the hydrating supplement solution to further may include of biotin in an amount from about 0.001 mg/ml to about 0.003 mg/ml.

Example Clause O: The method of any one of Example Clauses J-N, where mixing into the first bag, via the inlet of the first bag, ingredients in order for the first portion of the hydrating supplement solution to further may include of L-carnitine in an amount from about 1 mg/ml to about 3 mg/ml.

Example Clause P: The method of any one of Example Clauses J-O, where mixing into the first bag, via the inlet of the first bag, ingredients in order for the first portion of the hydrating supplement solution to further may include of L-taurine in an amount from about 0.1 mg/ml to about 0.3 mg/ml.

Example Clause Q: The method of any one of Example Clauses J-P, where mixing into the first bag, via the inlet of the first bag, ingredients in order for the first portion of the hydrating supplement solution to further may include of ketorolac tromethamine in an amount from about 0.06 mg/ml to about 0.18 mg/ml.

Example Clause R: The method of any one of Example Clauses J-Q, where mixing into the first bag, via the inlet of the first bag, ingredients in order for the first portion of the hydrating supplement solution to further may include of ondansetron in an amount from about 0.004 mg/ml to about 0.008 mg/ml.

Example Clause S: The method of any one of Example Clauses J-R, where mixing into the first bag, via the inlet of the first bag, ingredients in order for the first portion of the hydrating supplement solution to further may include of famotidine in an amount from about 0.02 mg/ml to about 0.04 mg/ml.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A saline solution for hydration consisting of:
ascorbic acid in an amount from about 1 mg/ml to about 5 mg/ml;
thiamine HCL in an amount from about 0.2 mg/ml to about 0.6 mg/ml;
niacinamide in an amount from about 0.2 mg/ml to about 0.6 mg/ml;
riboflavin 5 phosphate in an amount from about 0.004 mg/ml to about 0.012 mg/ml;
dexpanthenol in an amount from about 0.004 mg/ml to about 0.012 mg/ml;
pyridoxine HCL in an amount from about 0.004 mg/ml to about 0.012 mg/ml;
arginine HCL in an amount from about 0.2 mg/ml to about 0.6 mg/ml;
citrulline in an amount from about 0.1 mg/ml to about 0.3 mg/ml;
lysine HCL in an amount from about 0.1 mg/ml to about 0.3 mg/ml;
proline in an amount from about 0.1 mg/ml to about 0.3 mg/ml;
glutathione in an amount from about 1.2 mg/ml to about 2 mg/ml;
methylcobalamin in an amount from about 0.01 mg/ml to about 0.03 mg/ml;
magnesium chloride in an amount from about 0.16 mg/ml to about 0.48 mg/ml;
zinc sulfate in an amount from about 0.002 mg/ml to about 0.006 mg/ml;
manganese sulfate in an amount from about 0.00004 mg/ml to about 0.00012 mg/ml; and
copper gluconate in an amount from about 0.0004 mg/ml to about 0.0012 mg/ml.

2. A method of treating dehydration in a patient in need thereof comprising intravenously administering an effective amount of the hydrating supplement composition of claim 1 to the patient.

3. A saline solution for hydration consisting of:
ascorbic acid in an amount from about 1 mg/ml to about 5 mg/ml;
thiamine HCL in an amount from about 0.2 mg/ml to about 0.6 mg/ml;
niacinamide in an amount from about 0.2 mg/ml to about 0.6 mg/ml;
riboflavin 5 phosphate in an amount from about 0.004 mg/ml to about 0.012 mg/ml;
dexpanthenol in an amount from about 0.004 mg/ml to about 0.012 mg/ml;
pyridoxine HCL in an amount from about 0.004 mg/ml to about 0.012 mg/ml;
arginine HCL in an amount from about 0.2 mg/ml to about 0.6 mg/ml;
citrulline in an amount from about 0.1 mg/ml to about 0.3 mg/ml;
lysine HCL in an amount from about 0.1 mg/ml to about 0.3 mg/ml;
proline in an amount from about 0.1 mg/ml to about 0.3 mg/ml;
glutathione in an amount from about 1.2 mg/ml to about 2 mg/ml;
methylcobalamin in an amount from about 0.01 mg/ml to about 0.03 mg/ml;
magnesium chloride in an amount from about 0.16 mg/ml to about 0.48 mg/ml;
manganese sulfate in an amount from about 0.00004 mg/ml to about 0.00012 mg/ml; and
copper gluconate in an amount from about 0.0004 mg/ml to about 0.0012 mg/ml.

4. A saline solution for hydration consisting of:
ascorbic acid in an amount from about 1 mg/ml to about 5 mg/ml;
thiamine HCL in an amount from about 0.2 mg/ml to about 0.6 mg/ml;
niacinamide in an amount from about 0.2 mg/ml to about 0.6 mg/ml;
riboflavin 5 phosphate in an amount from about 0.004 mg/ml to about 0.012 mg/ml;
dexpanthenol in an amount from about 0.004 mg/ml to about 0.012 mg/ml;
pyridoxine HCL in an amount from about 0.004 mg/ml to about 0.012 mg/ml;
arginine HCL in an amount from about 0.2 mg/ml to about 0.6 mg/ml;
citrulline in an amount from about 0.1 mg/ml to about 0.3 mg/ml;
lysine HCL in an amount from about 0.1 mg/ml to about 0.3 mg/ml;
proline in an amount from about 0.1 mg/ml to about 0.3 mg/ml;
glutathione in an amount from about 1.2 mg/ml to about 2 mg/ml;
methylcobalamin in an amount from about 0.01 mg/ml to about 0.03 mg/ml;
magnesium chloride in an amount from about 0.16 mg/ml to about 0.48 mg/ml;
NAD+ in an amount from about 0.5 mg/ml to about 1 mg/ml;
manganese sulfate in an amount from about 0.00004 mg/ml to about 0.00012 mg/ml; and
copper gluconate in an amount from about 0.0004 mg/ml to about 0.0012 mg/ml.

* * * * *